United States Patent [19]
White et al.

[11] 3,934,471
[45] Jan. 27, 1976

[54] FLOW MONITORING SYSTEM

[76] Inventors: Percy William White, Oak Lodge, Great Tey, Essex; Frank William Batley, 3 Bowling Green, Great Waldingfield, Sudbury, Suffolk, both of England

[22] Filed: Jan. 29, 1974

[21] Appl. No.: 437,588

[30] Foreign Application Priority Data
Feb. 7, 1973 United Kingdom.................. 5983/73

[52] U.S. Cl........... 73/194 E; 73/205 D; 235/151.34
[51] Int. Cl.²........................................... G01F 1/74
[58] Field of Search ..... 73/28, 61 R, 194 E, 194 M, 73/205 D, 231 M; 235/151.34; 250/351, 356

[56] References Cited
UNITED STATES PATENTS

| | | | |
|---|---|---|---|
| 2,728,218 | 12/1955 | Ramser | 73/28 |
| 2,876,357 | 3/1959 | Waters | 250/351 X |
| 3,033,036 | 5/1962 | Leisey | 73/194 M |
| 3,408,488 | 10/1968 | Nihof et al. | 73/194 M X |
| 3,821,897 | 7/1974 | Frazel | 73/388 BN |

*Primary Examiner*—Charles A. Ruehl
*Attorney, Agent, or Firm*—Synnestvedt & Lechner

[57] ABSTRACT

The invention provides a novel form of mechanism for monitoring the rate of passage of a material dispersed in a fluid stream, which mechanism may be of use in the control of a plant for recovering the material from the fluid. The mechanism comprises means for measuring the flowrate of the fluid and means for measuring the concentration of the material in the fluid, the outputs from the two measurement means being fed to a device which gives an output proportional to the product of the signals from the measurement device, and thus proportional to the rate of passage of the material.

6 Claims, 9 Drawing Figures

FLOW MONITORING SYSTEM

BACKGROUND OF THE INVENTION

This invention relates to monitoring mechanisms, and in particular it concerns monitoring mechanisms for use in solvent recovery plants.

Many industrial processes use solvents, and often these solvents are discharged from the operating stages of the process in the form of an extremely diluted solvent-vapour-laden gas (the gas usually being air). For reasons of economy, or to avoid pollution, it is desirable to recover the solvents from the gas, and this can often be achieved by vapour-phase recovery using a material (for example, activated carbon) which will "strip" the solvent from the gas. The solvent is then recovered from the "stripping" material (in which it is present at concentrations considerably higher than it was in the discharged gas). In some instances a solvent-laden liquid may be discharged from an industrial process, and recovery of the solvent from the liquid may be effected by methods similar to those used in recovery from the gaseous phase. The recovery systems described hereinafter may be used to recover solvents from gases or liquids, but for convenience they refer only to recovery from solvent-laden gases.

One form of solvent recovery plant uses a two-stage recovery system. In the first stage, the solvent-laden gas is filtered, cooled or heated as necessary, and then passed through a bed of activated carbon, which "strips" the solvent from the gas; thus, the activated carbon gradually becomes loaded with solvent and will eventually extract no more solvent from the gas. The passage of the solvent-laden gas is then stopped, and, in the second stage of the recovery, steam is passed through the carbon beds to purge the solvent from the beds. The mixture of steam and solvent vapour so obtained is condensed, whereupon the liquid solvent and water so obtained is in most cases very easily separated.

In order for the solvent recovery to be a continuous process, a "two adsorber" recovery plant is used. While one adsorber is being charged with solvent, the other is being purged by steam, and when the bed of the first adsorber is loaded with solvent the solvent-laden gas supply is transferred to the second adsorber (the bed of which is now free of solvent), and the bed of the first adsorber purged with steam. This changeover procedure allows the solvent to be continuously extracted.

Control of the changeover of the functions of the adsorbers in a "two-adsorber" plant is important for efficient and economical running of the plant, and this control has previously been done in a number of ways. If the flowrate of solvent-laden gas into the system is steady, and the solvent-to-gas ratio is constant, the time for the bed to become loaded with solvent, which will be a constant, can be calculated, and the changeover of the adsorbers can be performed automatically or manually at fixed time intervals.

However, in practice the flowrate of gas into the recovery system may vary between wide limits, particularly if the system is taking, as its input, the outputs of solvent-laden gas from a number of sources. Nevertheless, if the solvent-to-gas ratio in the solvent-laden gas were constant then control could be effected by monitoring the flowrate of the incoming solvent-laden gas, and performing the changeover when a calculated amount of the solvent-laden gas had entered the recovery system. Unfortunately, however, in practice the solvent-to-gas ratio in the solvent-laden gas is very rarely constant and so this method too is of only very limited use.

SUMMARY OF THE INVENTION

It is an object of this invention to provide a monitoring mechanism for controlling the operation of a solvent recovery plant, which monitoring mechanism will provide efficient monitoring even when the fluid flowrate and the proportion of solvent in the solvent-laden fluid fluctuate considerably.

Accordingly, in one aspect this invention provides a mechanism for monitoring the rate at which material dispersed in a fluid stream passes through a given region and for giving an output signal proportional to that rate, which control mechanism comprises:

a. fluid flowrate measurement means for measuring the rate of flow of the fluid through the said given region, and for providing an output proportional thereto;

b. material concentration measurement means for measuring the concentration of the material in the fluid stream passing through the said given region, and for providing an output proportional thereto; and, operatively connected to the said fluid flowrate measurement means and the said material concentration measurement means, c. an integrative device for multiplying together the outputs from the said fluid flowrate measurement means and the said material concentration measurement means, and then summing the multiplied outputs, the integrative device incorporating a multiplying element for operating on the said electrical outputs from the said fluid flowrate measurement means and the said material concentration measurement means and producing a voltage output proportional to the product thereof, a voltage-to-frequency converter for converting said product to a pulsed constant amplitude signal, the frequency of the pulses thus being proportional to the rate of passage of said material, and a counting device for summing the pulses supplied thereto from the voltage-to-frequency converter.

Thus, the output of the integrative device at any time, is proportional to the rate at which the material dispersed in the fluid stream is passing through the given region at that time.

The term "dispersed" where used herein is intended to include the possiblities of the medium being dissolved, entrained or otherwise contained in the fluid stream.

It must also be emphasised that the term "proportional" where used herein includes the possibility of indirect proportionality - such as inverse proportionality or proportionality to the square - as well as direct proportionality.

DETAILED DESCRIPTION OF THE INVENTION

The fluid flowrate measurement means can be any convenient device capable of measuring the likely range of fluid flowrates. It may, for example, be an electrical device such as a hot wire device, in which an electrically-heated wire is positioned in the fluid stream, the rate of cooling of this wire being proportional to the fluid flowrate. However, if flammable solvents were present in the fluid stream the hot wire device might be impracticable because of the possibility of the solvent being ignited. The fluid flowrate measurement means might alternatively be a mechanical device; for example it might comprise a fan positioned in the fluid stream and driven by the passage of fluid, the rotational speed of the fan being proportional to the fluid flowrate.

Most conveniently, however, the fluid flowrate measurement device incorporates a fluid pressure measurement device, such as a pitot tube, venturi meter or an orifice plate. These devices measure the velocity head of the fluid stream - that is to say, they measure that part of the total pressure head of the fluid stream which is caused by the movement of the fluid. The velocity head is the difference in pressure between the total pressure head of the fluid stream and the static pressure head (and thus is measured as a differential pressure between two pressure tappings in the measurement device), and is proportional to the square of the velocity of the fluid. In order to obtain an output signal from the measurement means in a form suitable for feeding to the input of the integrative device, when using a pressure measurement device the measurement means also incorporates a differential pressure transmitter, which given an output signal proportional to the differential pressure between the pressure tappings, and thus proportional to the square of the fluid flowrate.

A preferred pressure measurement device incorporates a pitot-venturi flow element, as this is more sensitive than a simple pitot tube or venturi meter. The pitot venturi flow element comprises two concentric venturi tubes, which, in use, are positioned in the fluid stream with their axes parallel to the direction of the fluid flow, and so arranged in relation to each other that the trailing end of the inner venturi tube is in the same vertical plane as the throat of the outer venturi tube. This arrangement of the two venturi tubes gives an appreciably greater fluid flowrate through the inner venturi than there would be if the outer venturi tube were absent, and thus makes the pitot-venturi flow element much more sensitive to changes in the fluid flowrate than a simple venturi meter.

The pilot-venturi flow element has two pressure tappings - one pressure tapping in the throat of the inner venturi perpendicular to the fluid flow through the venturi (the static head tapping), and a second pressure tapping situated in the main fluid stream, the mouth of the tapping facing in the opposite direction to the fluid flow (the total head tapping) - the differential pressure between these two tappings being the velocity head of the fluid.

Particularly preferred pitot-venturi flow elements are the instruments known as the Taylor 88578 and 88579 models, which are available from the Taylor Instrument Companies (Europe) Limited, of Stevenage, England.

The differential pressure transmitter may be any unit capable of giving an output signal - usually electrical or pneumatic - proportional to the differential pressure between the two pressure tappings of the pressure device employed. The transmitter conveniently comprises a diaphragm across which the differential pressure is applied, the distortion of the diaphragm caused by the differential pressure being used to control the output signal. A preferred type of transmitter in which the output pressure of an air supply is controlled by, and proportional to, the differential pressure between the tappings, comprises a sealed chamber bisected by a diaphragm; the high pressure tapping is connected to the one side of the chamber, and the low pressure tapping to the other side of the chamber, so that there is a high pressure region on one side of the diaphragm, and a low pressure region on the other side. Changes in the differential pressure cause movement of the diaphragm, which movement is transmitted to a control valve governing the flow of an air supply.

A preferred differential pressure transmitter particularly suitable for use with the Taylor 88578 or 88579 pitot-venturi flow element, is the instrument known as the Taylor 301T model A, which is also available from the Taylor Instrument Companies (Europe) Limited.

The material concentration measurement means can be any suitable device capable of detecting and measuring the likely range of concentrations of material in the fluid stream. The material concentration measurement means normally operate by measuring a physical property of the solvent-laden gas, which property varies with a change in solvent concentration. Suitable measureable properties of the solvent-laden gas are its resistance (or conductance) and its absorption of radiation. By comparison of the magnitude of the measured property for the solvent-laden gas with that for a sample of gas containing no solvent but under the same physical conditions as the solvent-laden gas (a reference sample), the change in the property of the gas due to the solvent, and thus the amount of solvent present, may be ascertained.

A preferred material concentration measurement device utilises the variation in the amount of infra-red radiation absorbed by the gas with the amount of solvent present in the gas. The device comprises two cells, one of which is the reference cell, which contains a sample of gas containing no solvent, and the other is the sample cell, through which a sample of the solvent-laden gas is fed. Two identical I.R. beams are directed to pass one along each cell, and an interrupter alternatively blocks the radiation to each cell. Situated at the opposite end of the cells to the sources is the detector, which is preferably in the form of a further cell, fitted with a diaphragm, which contains a gas. The interrupter alternatively allows radiation to pass along the reference cell and the sample cell, and so the detector alternatively receives radiation from each cell. When the absorbtion of the I.R. beam by the solvent in the solvent-laden gas causes the radiation entering the detector from the sample cell to decrease, the gas in the detector cell is alternately subjected to high and low intensity I.R. beams, and this causes corresponding expansions and contractions of the detector gas. These expansions and contractions cause movements of the diaphragm, which movements are used to control the output of the concentration measurement means. If the diaphragm is set up to form one plate of a capacitor, the movement will cause corresponding changes in capacity, which may be used to modulate an electrical signal. The modulated signal may then, if necessary, be fed to an amplifier to be amplified to a suitable level for the next stage in the control system.

A particularly preferred unit of the above type is the instrument known as the LIRA 300 infra-red analyser, which is available from M.S.A. of Pittsburgh, U.S.A.

The output signals from the measurement devices may not be suitable for feeding directly to the inputs of the integrative device. Thus, they may have to be changed either in type (for example, for an electrical to a pneumatic signal, or vice versa), in the relation between the output and the measured quantity (for example, the integrative device may require that the inputs are directly proportional to the measured quantities), or in magnitude (for example, they may require amplification).

The preferred flowrate measurement device of the invention has a pneumatic output proportional to the velocity head of the fluid stream - that is, proportional to the square of the fluid flowrate. The preferred integrative device, as described hereinafter, is an electronic device which requires an electrical input signal directly proportional to the fluid flowrate. The necessary modifications to the output from the flowrate measurement device are conveniently carried out by first converting the pneumatic output signal to a pneumatic signal directly proportional to the fluid flowrate (using a square root extractor), and then converting this pneumatic signal to an electrical signal.

The square root extractor is a device capable of giving an output proportional to the square root of its input. A preferred unit which may be used with pneumatic signals comprises a control valve which regulates the flow of an air supply, this control valve being operated by the movements of a number of bellows - an input bellows to which is connected the pneumatic input, and output bellows connected via a bleedline to the output of the air supply from the control valve - and the bellows movements are coupled to the control valve in such a way that the air supply output pressure is proportional to the square root of the input pressure. A preferred square root extractor, particularly suitable for use with the Taylor instruments described herein, is the instrument known as the Taylor 376N model A, which is available from Taylor Instrument Companies (Europe) Limited.

In a preferred embodiment, the pneumatic output signal from the square root extractor is then converted to an electrical signal. It may in other embodiments, of the invention be necessary or desirable to convert pneumatic signals to electric signals at other points in the monitoring system, and naturally the converter described hereinafter is equally applicable in these cases. The preferred unit for performing the conversion comprises a pneumatic servo motor, which converts variations in a pneumatic input signal into angular rotations directly proportional to the input pressure, which servo motor is coupled to a potentiometer in such a way that a change in input pressure alters the potentiometer setting. The potentiometer can be incorporated into an electrical circuit so that an electrical output proportional to the resistance of the potentiometer, and so proportional to the input pressure, is produced. A particularly preferred unit of this type is the unit known as the Taylor Transcope Transducer type 708T, which is available from Taylor Instrument Companies (Europe) Limited.

The integrative device has an input signal proportional to the fluid flowrate and an input signal proportional to the material concentration in the fluid; it combines these two signals to give an output proportional to the product of the input signals and thus to the rate of passage of material. Most conveniently this integrative device is an electronic device, and preferably it comprises an amplifier for each input, together with a multiplying element capable of giving the required output. The amplifiers are buffer amplifiers (or conditioning amplifiers) which filter off any noise or unwanted parts of the input signal (so protecting the computing element from spurious external effects), as well as amplifying the input signal. The signals from the buffer amplifiers are fed to the multiplying element, which is an element whose output voltage Z at any instant is related to the input voltages X and Y at that instant by the expression $Z = KXY$, where K is a constant. Thus, the output voltage from the multiplying element is proportional to the rate of passage of the dispersed material.

The output from the integrative device described above is in the form of a voltage the magnitude of which is determined by the rate of passage of material past the measurement means of the control mechanism. In a preferred embodiment, this output is used to provide an indication of the amount of material that has passed the measurement means in a given time. This is most conveniently acheived by first converting the varying voltage to a pulsed constant amplitude signal, the frequency of the pulses being proportional to the rate of passage of material - that is, each pulse corresponding to the passage of a fixed amount of material. Then by summing the pulses the amount of material which passes the measurement means in a given time can be found.

The conversion of the varying voltage signal to a pulsed constant-amplitude signal may be performed by any suitable voltage-to-frequency converter, which converters are well known in the art. As stated above, the mechanism preferably also contains a counting device capable of summing the pulses in the output from the converter. The counter is conveniently set up to count to a predetermined number, send out a "triggering signal," and then return to zero and recommence counting. By choosing the number of pulses at which the triggering signal is sent out to correspond to the optimum amount of solvent which may be adsorbed by the beds, this signal can be used either to indicate that the changeover is necessary or actually to effect the changeover. Thus, the signal may either trigger an audible and/or visual alarm to draw the plant operators attention to the necessity of changing over the adsorber, or the signal may be used to trigger automatic means for effecting the changeover. In the latter case, the mechanism would not require supervision, and could be set up to effect the changeover at the optimum time, and so act as a control mechanism for the recovery plant.

The counting device preferably also has a visual indication of the number of pulses counted so that an observer may see how much solvent has passed through the solvent recovery plant since the last changeover of adsorbers. Most conveniently this visual indication is in the form of a countdown to when the next changeover is required.

The integrative device, the voltage-to-frequency converter and the counting device could all be separate units, but in a preferred embodiment of the invention they are combined into one unit.

BRIEF DESCRIPTION OF THE DRAWINGS

A preferred embodiment of the invention will now be described, though by way of illustration only, with reference to the accompanying drawings, in which:-

DESCRIPTION OF THE PREFERRED EMBODIMENT OF THE INVENTION

Figure 1:
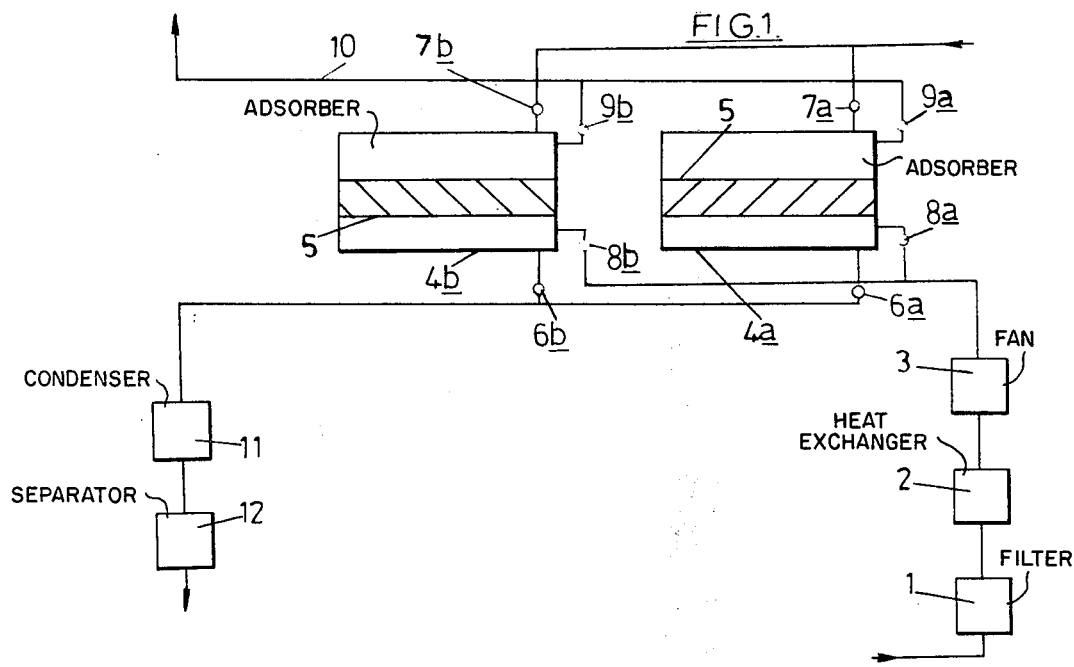
FIG. 1 is a schematic diagram of a "two-adsorber" two-stage solvent recovery plant.

FIG. 1 shows a solvent recovery plant into which a solvent-laden gas is passed. The solvent-laden gas is passed through a filter 1, cooled in a heat exchanger 2, and driven through the rest of the system by a fan unit 3. The solvent recovery plant has two adsorbers, comprising chambers 4a, 4b containing activated charcoal beds 5, which chambers are provided with valves 6a, 6b, 7a, 7b, 8a, 8b, 9a, 9b, which enable either the solvent-laden gas or steam to be passed through the chambers. When valves 8a, 9a are open, and valves 6a, 7a shut, the solvent laden gas is passed into chamber 4a, and through the bed 5, which strips the solvent from the carrier gas. The carrier gas then passes through valve 9a into the exhaust line 10. At the same time, valves 6b, 7b are open, and valves 8b, 9b are shut, and steam is passed into chamber 4b and through the bed 5, and the steam purges solvent from this bed. The steam and solvent mixture passes through valve 6b to a condenser 11, and the condensed mixture then passes to the product separator 12, where particular solvents can be separated out.

When bed 5 in chamber 4a is loaded with solvent, and can, therefore, strip no more solvent from the incoming gas, valves 8a, 9a, 6b, 7b are closed and valves 6a, 7a, 8b, 9b open. The solvent laden gas is then passed through chamber 4b, and the steam through chamber 4a. Thus, the bed 5 in chamber 4a is gradually purged of solvent, while the bed 5 in chamber 4b becomes loaded with solvent.

By interchanging the functions of the two chambers in this manner continuous solvent recovery can be achieved.

Figure 2:
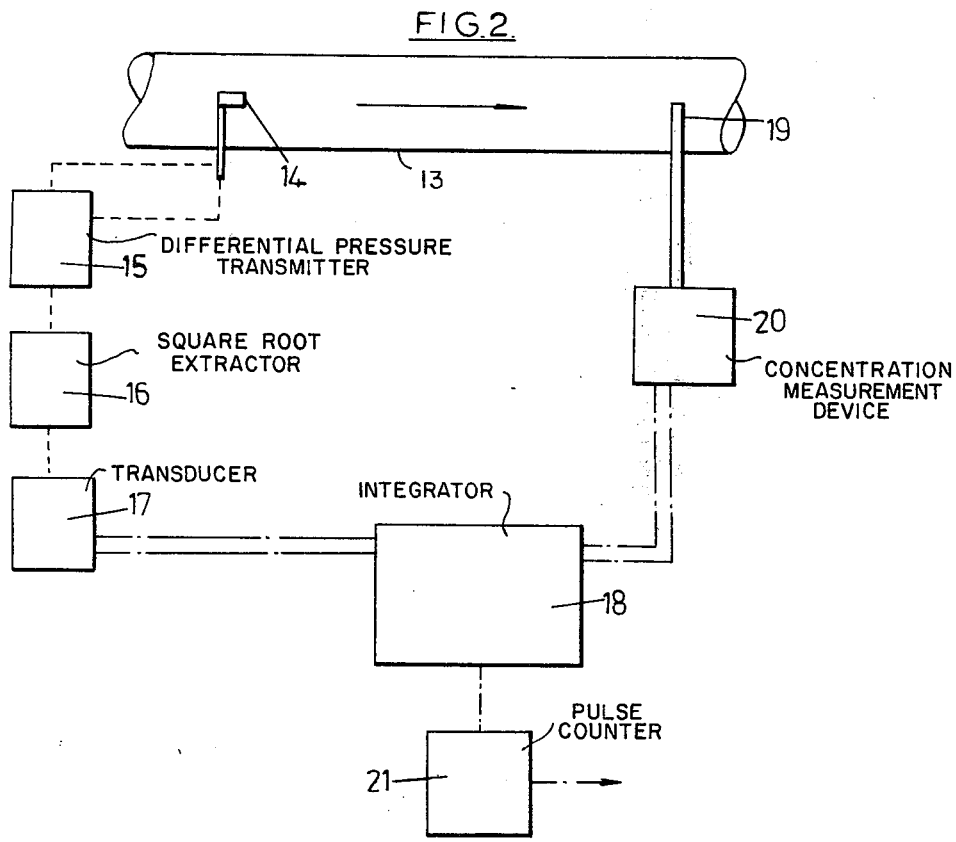
FIG. 2 is a schematic diagram of a control mechanism of the invention.

FIG. 2 shows a control mechanism of the invention set up to monitor the amount of solvent passing through a section 13 of the inlet pipe to the solvent recovery plant. A pitot-venturi flow element 14 is situated in the pipe section 13 to measure the flowrate of the solvent laden gas, and the pressure tappings in this pitot-venturi flow element 14 are connected to a differential pressure transmitter 15 which gives a pneumatic output proportional to the differential pressure between the pressure tappings. This pneumatic output is fed to a pneumatic square root extractor 16, and the output from this device (which output is proportional to the square root of the input) is fed to the transducer 17 which converts the pneumatic signal to an electrical signal which is then fed to the integrative device 18.

Also situated in the pipe section 13 is the probe 19 of a concentration measurement device 20, which measures the concentration of solvent in the solvent-laden gas. The electrical output from this concentration measurement device 20, which output is proportional to the concentration of solvent in the solvent laden gas, is fed to the integrative device 18.

The integrative device incorporates a voltage-to-frequency converter, and so the output therefrom is in the form of a pulsed signal, each pulse corresponding to the passage of a certain amount of solvent through the pipe section 13. A counter 21 sums the number of pulses it receives from the integrative device 18, and when a predetermined number of pulses have been received it sends out a triggering signal, which is used to trigger a alarm or to trigger the automatic changeover of the beds.

Figure 3:
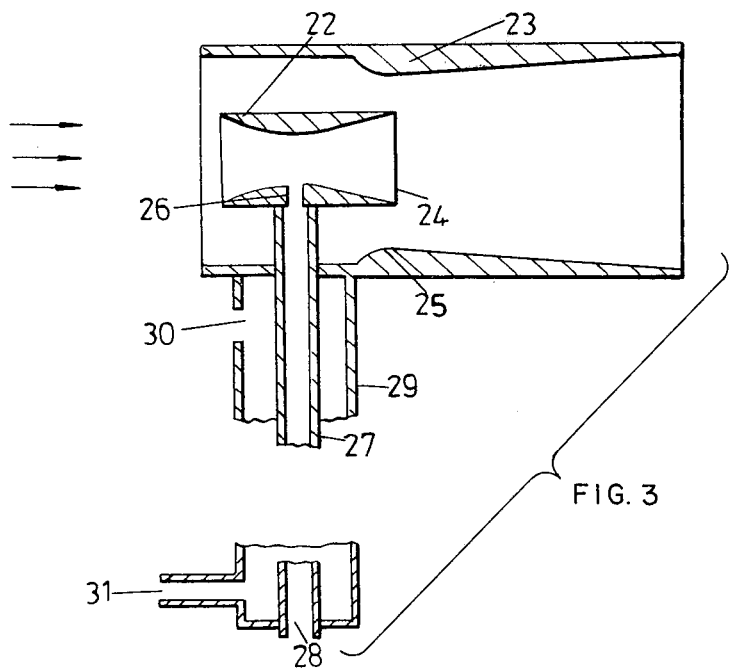
FIG. 3 is a cross-sectional diagram of a pitotventuri flow element for use in the control mechanism of the invention.

FIG. 3 shows a vertical cross-section of a pitot-venturi flow element 14. It comprises an inner venturi 22 and an outer venturi 23 mounted concentrically such that the trailing end 24 of the inner venturi 22 is in the same vertical plane as the thoat 25 of the outer venturi 23.

There is a static pressure head tapping 26 in the throat of the inner venturi 22, connected to a tube 27, which as well as communicating the static head to the low pressure terminal 28, also serves to support the inner venturi 22 in its correct position. Concentric to tube 27, is the larger diameter tube 29, which serves as a support for the whole pitot-venturi flow element. The total head tapping 30 is situated on the tube 29 facing in the opposite direction to the fluid flow, and therefore, the tube 29 also serves to communicate this total head to the high pressure terminal 31.

Figure 4:
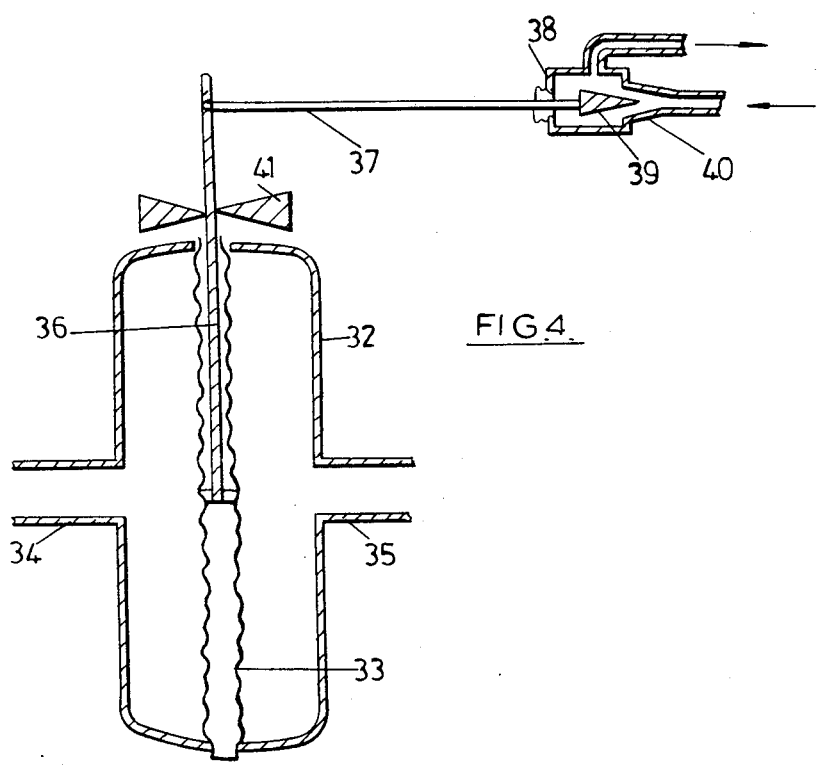
FIG. 4 is a schematic diagram of a simple differential pressure transmitter for use in the control mechanism of the invention.

FIG. 4 shows a vertical cross-section of a much simplified example of a differential pressure transmitter. It comprises a chamber 32 bisected by a diaphragm 33 with pressure connections 34, 35. These pressure connections 34, 35 are connected to the high and low pressure terminals, 31 and 28 respectively, of the flowrate measurement device. A change in the differential pressure between the two sides of the chamber 32 gives rise to a movement of the diaphragm 33 which is coupled, by a lever 36, (pivoted at 41) and a lever 37, to the air supply control 38. This control comprises a valve 39 which is moved in relation to its seat 40 by the lever 37, and this movement regulates the flow of an air supply. The regulated air flow provides an output pressure proportional to the differential pressure across the diaphragm.

Figure 5:
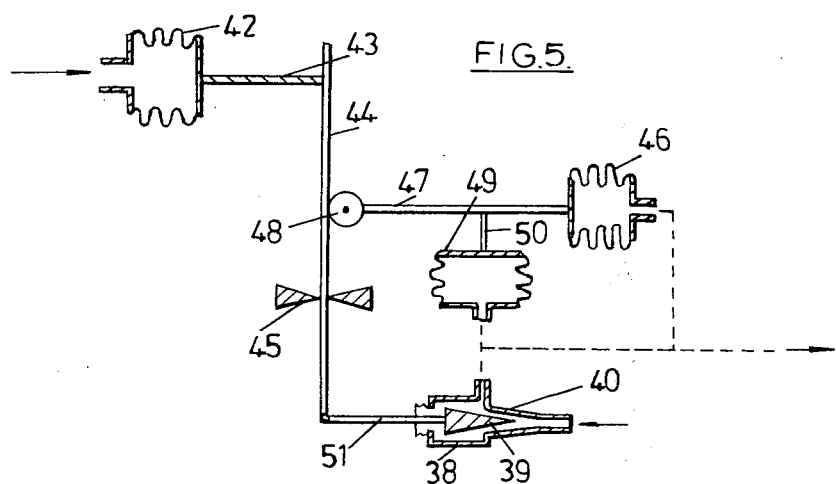
FIG. 5 is a schematic diagram of a simple pneumatic square root extractor for use in the control mechanism of the invention.

FIG. 5 shows a vertical cross-section of a much simplified example of a square root extractor. The pneumatic input is fed to the input bellows 42, the movement of which is transmitted by a rod 43 to a lever 44 (pivoted at 45).

The lever 44 is connected by a lever 51 to valve 39 of an air supply control 38 (as described above). Bleed-lines from the output of this control feed the bellows 46 and 49. The force on the lever due to the input bellows 42 is opposed by the force due to the bellows 46, the movement of which is transmitted to the lever 44 by means of rod 47 and roller 48. The position of roller 48 is governed by the bellows 49 which act on rod 47 by means of rod 50.

The combined action of the three sets of bellows 42, 46 and 49, is such that the output pressure from control 38 is proportional to the square root of the input pressure into bellows 42.

Figure 6:
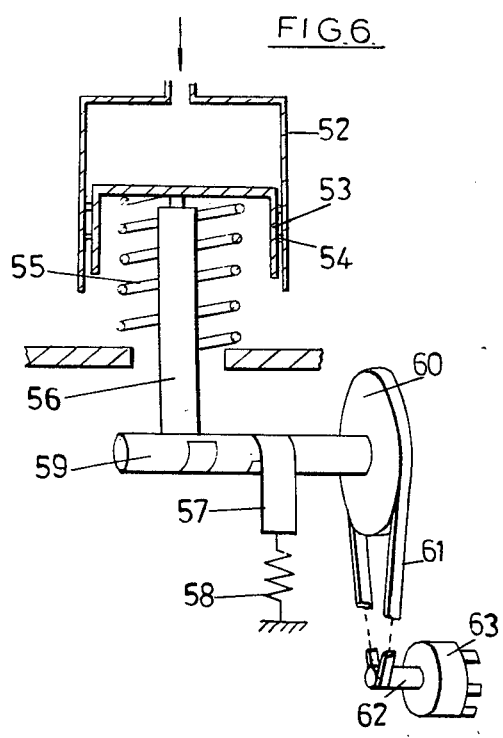
FIG. 6 is a schematic diagram of a simple device for converting a pneumatic signal to an electrical signal for use in the control mechanism of the invention.

FIG. 6 shows a partially cut-away diagram of a much simplified example of a device for converting a pneumatic signal to an electrical signal. The pneumatic input is fed to a cylinder 52 containing a piston 53 with sealing rings 54. The movement of the piston 53, against spring 55, is converted by the flexible strip 56, in association with the flexible strip 57 and spring 58, to an angular displacement of the shaft 59. The shaft 59 is in turn coupled by means of pulley 60 and belt 61 to the spindle 62 of potentiometer 63.

Thus, a variation in the input pressure varies the potentiometer setting, and by incorporating the potentiometer in an electrical circuit, not shown, an electrical output proportional to the input pressure may be obtained.

Figure 7:
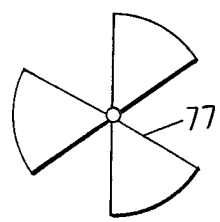
FIG. 7 is a schematic diagram of a solvent concentration measurement device for use in the control mechanism of the invention.

FIG. 7 shows a vertical cross-section of a simplified example of a solvent concentration measurement device incorporating an infra-red analyser.

Two similar infra-red sources 71, 72 produce beams of I.R. radiation which pass through I.R. transparent windows 73 into parallel cells 74, 75. One cell 74 is the reference cell, and contains a sample of gas containing no solvent, the other cell 75 is the sample cell, and through this passes a stream of solvent-laden gas drawn off from the main flow by probe 19 (see FIG. 2). Interrupter 76 alternately blocks each beam to the cells 74, 75 (the interrupter is in the form of a sectored disc 77 - shown in plan view in the inset - rotated by motor 78). Thus, a beam of I.R. radiation alternately passes along the sample cell 75 and along the reference cell 74. The radiation leaves these cells by windows 73, and enters the detection cell 79 through windows 73. The gas in this detection cell alternately expands and contracts as the two beams are not of equal intensity due to the absorption by the solvent in the sample cell 75. This change in volume is converted into movements of the diaphragm 80, and this movement alters the capacity of the condenser microphone 81. The electrical signal generated, which is proportional to the solvent concentration in the solvent laden gas, is amplified by the amplifier 82, and then fed to the next stage in the control system.

Figure 8:
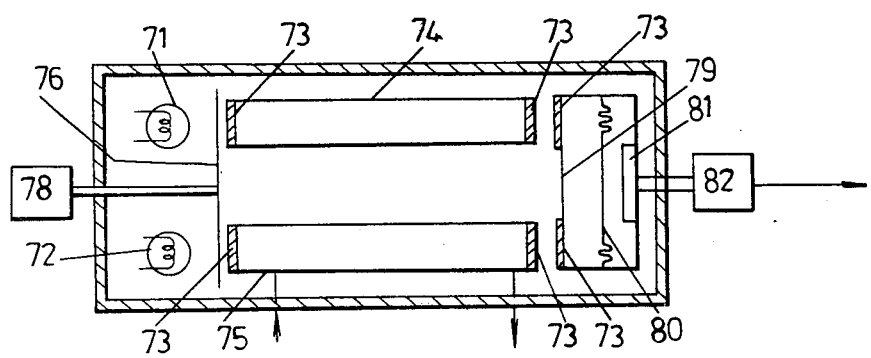
FIg. 8 is a block diagram of an integrative device for use in the control system of the invention.
Figure 8:
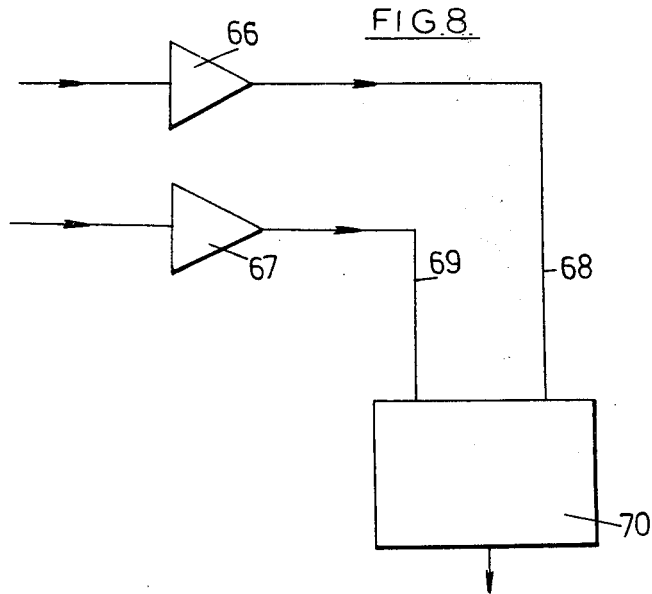

FIG. 8 shows a block diagram of an electronic integrative device, in which one input - derived from the output of the fluid flowrate measurement device shown in FIG. 3 - is fed to a buffer amplifier 66, and the other input - derived from the output from the material concentration measurement device shown in FIG. 7 - is fed to a buffer amplifier 67; these buffer amplifiers 66 and 67 filter any unwanted "noise" from the signals, and also amplify the signals before they are fed, via signal leads 68 and 69, to the multiplying element 70. The multiplying element is such that its output voltage Z at any instant is related to the input voltages X and Y at that instant by the expression $Z = KXY$, where K is constant. Thus, the output voltage is proportional to the rate of passage of the dispersed material.

Figure 9:
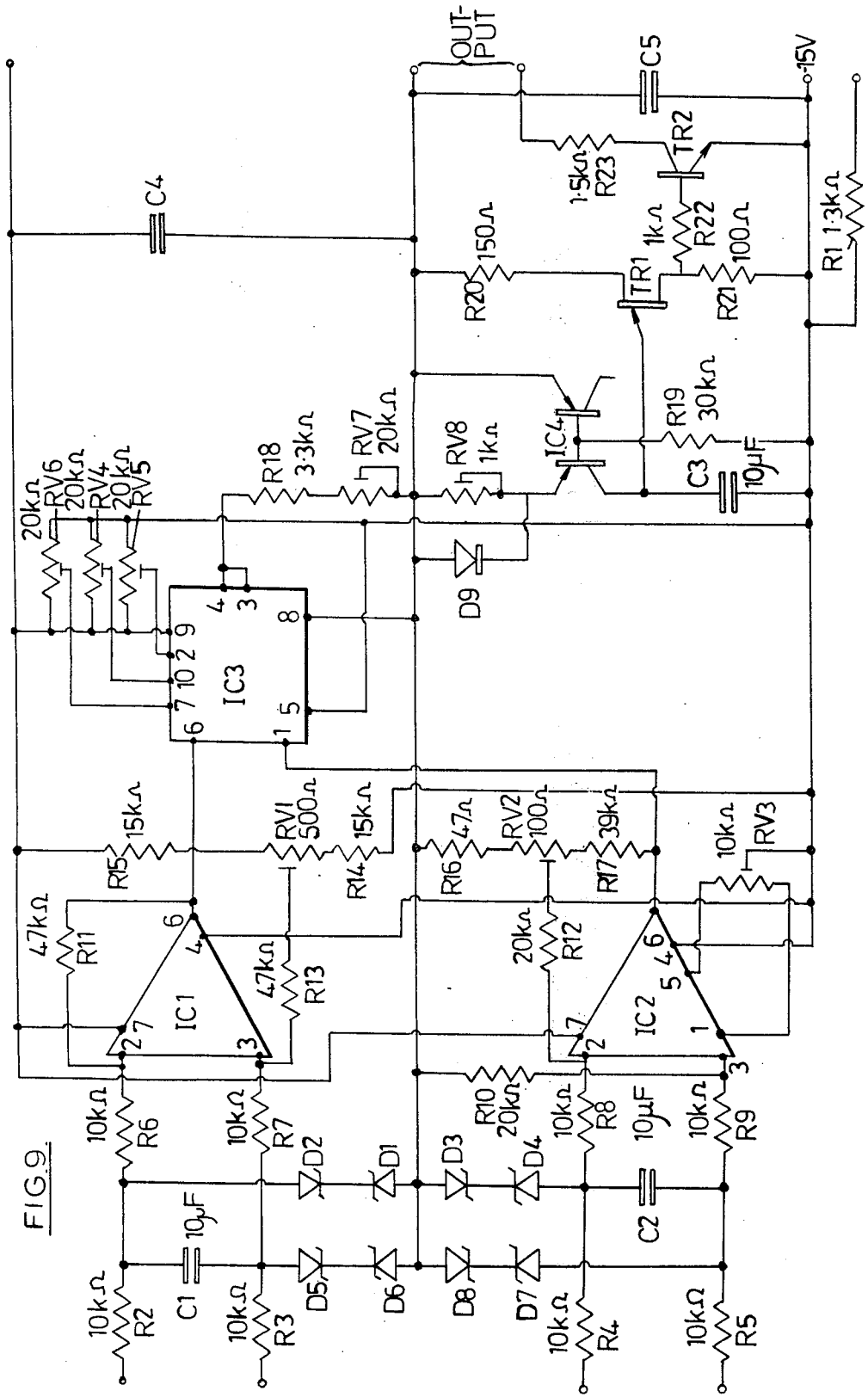
FIG. 9 is a circuit diagram of an integrative device as shown in FIG. 8.

FIG. 9 is a circuit diagram of an integrative device, in which the components are identified as follows:

| Diodes | | |
|---|---|---|
| D1 | Texas | TS2100 |
| D2 | " | " |
| D3 | " | " |
| D4 | " | " |
| D5 | " | " |
| D6 | " | " |
| D7 | " | " |
| D8 | " | " |
| D9 | " | IN4148 |
| Transistors | | |
| TR1 | Texas | TIS43 |
| TR2 | " | BC183L |
| Integrated Circuits | | |
| IC1 | Texas | SN72741P |
| IC2 | " | " |
| IC3 | ANOLOGUE | AD530J |
| IC4 | MOTOROLA | MD7003A |

The output from the fluid flowrate measurement device is fed via input A to terminals 2 and 3 of IC1, and similarly the output from the material concentration device is fed via input B to terminals 2 and 3 of IC2. The integrated circuits IC1 and IC2 function as conditioning amplifiers, filtering off any noise from the signals, and amplifying the signals to a nominal 10 volts. The outputs from the terminals 6 of these amplifier circuits are fed to terminals 1 and 6 of IC3, which is a multiplier circuit and gives an output voltage at terminals ¾ proportional to the product of the input signals. This voltage signal is converted to a pulse train by the unijunction transitor TR1. The pulsed output is then fed to a pulse counter (as was shown in FIG. 2) which sums the number of pulses in the output.

We claim:

1. A mechanism for monitoring the rate at which material dispersed in a fluid stream passes through a given region, and for giving an output signal proportional to that rate, which mechanism comprises:
   a. fluid flowrate measurement means for measuring the rate of flow of the fluid through the said given region, and for providing an electrical output proportional thereto;
   b. material concentration measurement means for measuring the concentration of the material in the fluid stream passing through the said given region, and for providing an electrical output proportional thereto; and, operatively connected to the said fluid flowrate measurement means and the said material concentration measurement means
   c. an integrative device for multiplying together the outputs from the said fluid flowrate measurement means and the said material concentration measurement means, and then summing the multiplied outputs, the integrative device incorporating a multiplying element for operating on the said electrical outputs from the said fluid flowrate measurement means and the said material concentration measurement means and producing a voltage output proportional to the product thereof; the multiplying element producing an output voltage Z at any instant related to its two input voltages X and Y such that $Z = KXY$, where K is a constant, there being two buffer amplifiers, one of the said two buffer amplifiers operating on each of the said two inputs, a voltage-to-frequency converter for converting said product to a pulsed constant amplitude signal, the frequency of the pulses thus being proportional to the rate of passage of the said material, and a counting device for summing the pulses supplied thereto from the voltage-to-frequency converter.

2. A mechanism as in claim 1, in which the said fluid flowrate measurement means incorporates a pitot-venturi flow element having two pressure tappings, the output from the said pitot-venturi flow element being in the form of a differential pressure between the said two tappings, a differential pressure transmitter having a pneumatic output, which transmitter includes a diaphragm across which the said differential pressure is applied, the distortions of the diaphragm caused by changes in the differential pressure being used to control the said pneumatic output of the differential transmitter, and a transducer device for converting the pneumatic output to the said electrical output proportional to fluid flowrate.

3. A mechanism as in claim 2, which incorporates a pneumatic square root extractor having a pneumatic input and a pneumatic output, the pneumatic output being proportional to the square root of the pneumatic input, the said pneumatic output of the fluid flowrate measurement means being fed to the said pneumatic square root extractor, and the pneumatic output therefrom being converted to the said electrical output.

4. A mechanism as in claim 1, in which the material concentration measurement means employs infra-red radiation and means for measuring the variation between the amount of infra-red radiation adsorbed by the said fluid with an amount of the said material present therein and the amount of infra-red radiation adsorbed by said fluid alone.

5. A mechanism for monitoring the rate at which material dispersed in a fluid stream passes through a given region, and for giving an output signal proportional to that rate, which mechanism comprises:
 a. fluid flowrate measurement means for measuring the rate of flow of the fluid through the said given region, said fluid flowrate measurement means incorporating a pitot-venturi flow element having two pressure tappings, the output from the said pitot-venturi flow element being in the form of a differential pressure between said two tappings, and a differential pressure transmitter having a pneumatic output, which transmitter includes a diaphragm across which the said differential pressure is applied, the distortions of the diaphragm caused by changes in the differential pressure being used to produce a further pneumatic output, a pneumatic input coupled to said further pneumatic output, the output from the square root extractor being proportional to the square root of the said further pneumatic output, and a transducer device for converting the extractor output to an electrical output proportional to the fluid flowrate;
 b. material concentration measurement means for measuring the concentration of the material in the fluid stream passing through the said given region, said material concentration measurement means employing infra-red radiation and means for measuring the variation in the amount of infra-red radiation adsorbed by the said fluid with the said material present therein including a reference cell which contains a sample of fluid containing no dispersed material, a cell through which a sample of the fluid containing dispersed material is fed; means for directing two identical infra-red beams to pass one of said two beams through the said reference cell and the other of said two beams through the sample cell, an interrupter which alternately blocks the radiation to each of the said sample cell and the said reference cell, a detector incorporating a detector cell containing a gas and fitted with a diaphragm, the said detector cell being adapted to receive radiation alternately from each of the said sample cell and the said reference cell which in turn causes expansions and contractions of the said gas, and the said diaphragm forming one plate of a capacitor such that the movement of the said diaphragm caused by the said expansion and contraction of the said gas gives rise to corresponding changes in capacity serving to modify the operation of an electrical device to provide an electrical output proportional to said material concentration; and operatively connected to the said fluid flowrate measurement means and the said material concentration measurement means
 c. an integrative device for operating on the electrical outputs derived from the said fluid flowrate measurement means and the said material concentration measurement means, the integrative device being an electronic device having two inputs and an output and comprising two amplifiers, one of said amplifiers for each of said two inputs and a multiplying element, which multiplying element is an element whose output voltage Z at any instant is related to its input voltages X and Y at that instant by the expression $Z = KXY$, where K is a constant, the integrative device further comprising a voltage-to-frequency converter and a counting device, the said output from the integrative device being converted to a pulsed constant amplitude signal by the said voltage-to-frequency converter, the frequency of the pulses thus being proportional to the rate of passage of the said material, and the pulses in said pulsed constant amplitude signal being summed by the said counting device.

6. In an adsorbing installation comprising an adsorber having beds of adsorbent material through which a materialladen fluid is passed so as to adsorb the material from the fluid, the improvement of providing:
 a. fluid flowrate measurement means for measuring the rate of fluid flow through a given region upstream of the adsorber, and producing an electrical output proportional thereto;
 material concentration measurement means for measuring the concentration of material in the fluid stream passing through said given region, and producing an electrical output proportional thereto; and
 an electrical integrative device for operating on the two electrical outputs from the fluid flowrate measurement means and the material concentration measurement means respectively, which integrative device includes a multiplying element and a summing element, the multiplying element producing an electrical signal proportional to the product of the said two electrical outputs and the summing element integrating said electrical signals to indicate the saturation state of the beds of the adsorber.

* * * * *

UNITED STATES PATENT AND TRADEMARK OFFICE
CERTIFICATE OF CORRECTION

PATENT NO. : 3,934,471
DATED : January 27, 1976
INVENTOR(S) : Percy W. White & Frank W. Batley It is certified that error appears in the above-identified patent and that said Letters Patent are hereby corrected as shown below:

Column 2, line 40, read --the-- before "said material,".

Column 3, line 22, "given" should read --gives--.

Column 3, line 40, "pilot-venturi" should read --pitot-venturi--.

Column 4, line 63, "for an" should read --from an--.

Column 6, line 64, "pitotventuri" should read --pitot-venturi--.

Column 9, line 58 Table, col. 3, "TS2100" should read --IS2100--.

Column 12, line 38, "materialladen" should read --material-laden--.

Column 12, line 44, read --b.-- before "material".

Column 12, line 49, read --c.-- before "an electrical".

Signed and Sealed this

Seventeenth Day of August 1976

[SEAL]

Attest:

RUTH C. MASON
Attesting Officer

C. MARSHALL DANN
Commissioner of Patents and Trademarks